US005920302A

United States Patent [19]

[11] Patent Number: 5,920,302

[45] Date of Patent: Jul. 6, 1999

Inoue et al.

[54] DISPLAY SCROLLING CIRCUIT

[75] Inventors: Makoto Inoue, Yokohama; Shigeichi Nakamura, Tokyo, both of Japan

[73] Assignee: Namco Ltd., Tokyo, Japan

[21] Appl. No.: 08/433,510

[22] PCT Filed: Sep. 16, 1994

[86] PCT No.: PCT/JP94/01528

§ 371 Date: May 11, 1995

§ 102(e) Date: May 11, 1995

[87] PCT Pub. No.: WO95/08168

PCT Pub. Date: Mar. 23, 1995

[30] Foreign Application Priority Data

Sep. 16, 1993 [JP] Japan .................................... 5-255175

[51] Int. Cl.[6] .............................. G09G 1/06; G06F 3/153

[52] U.S. Cl. ............................................ 345/125; 345/516

[58] Field of Search .................................... 345/125, 123, 345/114, 124, 28, 112, 127, 129, 130, 121, 507, 515, 197, 516, 517, 214

[56] References Cited

U.S. PATENT DOCUMENTS

| | | | |
|---|---|---|---|
| 4,602,251 | 7/1986 | Sawada et al. | 345/123 |
| 4,611,202 | 9/1986 | DiNitto et al. | 345/28 |
| 4,714,919 | 12/1987 | Foster | 345/123 |
| 4,769,637 | 9/1988 | Forrester et al. | 345/125 |
| 4,965,670 | 10/1990 | Klinefelter | 345/114 |
| 5,200,738 | 4/1993 | Fumoto et al. | 345/123 |
| 5,477,240 | 12/1995 | Huebner et al. | 345/123 |

FOREIGN PATENT DOCUMENTS

| | | |
|---|---|---|
| A-59-36287 | 2/1984 | Japan . |
| A-61-84687 | 4/1986 | Japan . |
| A-61-245189 | 10/1986 | Japan . |
| A-61-289383 | 12/1986 | Japan . |
| A-62-150290 | 7/1987 | Japan . |
| A-63-131181 | 6/1988 | Japan . |
| A-4-96097 | 3/1992 | Japan . |

*Primary Examiner*—Steven J. Saras
*Assistant Examiner*—John Suraci
*Attorney, Agent, or Firm*—Oliff & Berridge PLC

[57] ABSTRACT

A display scrolling circuit is provided which can give a variety to a display image by scrolling the display image for every display line without provision of a burden on a processor for computing a game. A game system to which the present invention is applied has a CPU 10, a video RAM (VRAM) 12, a character generator (CG) 14, scroll registers (SR) 16, 18, 20 and 22, a VRAM address control circuit 30, a CG address control circuit 32, an in-character transverse correction circuit 34 and a color palette 36. The VRAM 12 stores vertical and horizontal position data for every display line and absolute flags AF indicating whether these vertical and horizontal position data are absolute or relative values. The VRAM address control circuit 30 reads the position and other data from the VRAM 12 during the horizontal blanking period to set the read addresses of the VRAM 12 required to display one line. Therefore, the amount of scrolling for every display line can be set without provision of a burden on the CPU 10.

14 Claims, 7 Drawing Sheets

DISPLAY SCROLLING CIRCUIT

BACKGROUND OF THE INVENTION

1. Field of the Invention

The present invention relates to a display scrolling circuit suitable for use in game machines and the like wherein images are displayed by a unit of characters or pixels.

2. Description of the Prior Art

In general, display devices used in the game machines and the like are classified into two systems. One of them is a character display system while the other system is a bit map display system.

The character display system displays a picture formed by a combination of characters. When a character to be displayed is specified, the color data of pixels corresponding to that character (e.g., one character being formed by 8 pixels×8 pixels) are also specified. On the contrary, the bit map display system directly specifies the color data of each of pixels forming an image. In any event, red-green-blue (RGB) data is finally specified for every scan line on CRT or the like. The color components corresponding to the RGB data for one scan line will be displayed on the display in synchronism with each scan.

The conventional game machines have a function of scrolling the entire display image in the horizontal or vertical direction. An image which can be scrolled may be formed to have a magnitude four times larger than the normal static image, for example. The conventional display circuit scrolls an image on the display by suitably moving an area to be displayed. Such scrolling is performed in the horizontal or vertical direction according to the need. When the scroll is simultaneously made both in the horizontal and vertical directions, the entire image will be diagonally scrolled.

However, the conventional display circuits are adapted to do the same amount of scrolling for the entire display image. Thus, the scroll cannot be variable for every display line. This raised a problem in that the image cannot be eventful by utilizing the scroll.

The inventors found that if the amount of scrolling can be differently set for every line, many kinds of images can be simply formed. If it is now assumed that a straight road extending in the vertical direction is to be displayed, such a road can be deformed into any one of various curved roads by varying the amount of horizontal scrolling for every line.

However, the conventional display circuits could not make such an image display since they could not vary the amount of scrolling for every display line.

Among the commercially available processors, there is a processor to which a graphic controller function is added. When such a processor is used, the scroll can be carried out for every group of lines, relating to one display image. In such a case, the processor must be interrupted each time when the amount of scrolling is changed for every group of lines. After the processor has been interrupted, it will set a new amount of scrolling. This newly set amount of scrolling is used to display a new image. In such a manner, scrolling can be made for every group of lines, as described.

When the processor is interrupted to vary the amount of scrolling for every group of lines, the burden on the processor extremely increases. More particularly, when the processor is interrupted to set a new amount of scrolling, the game computation inherently executed by the processor will be interrupted. If the setting of the amount of scrolling is not terminated until initiation of the next line display, the next line will not be displayed by the proper amount of scrolling. This is undesirable since a flicker is produced on the display.

SUMMARY OF THE INVENTION

In view of such problems, it is an object of the present invention to provide a display scrolling circuit which can give a variety to a display image by scrolling the display image for every line and yet which will not increase the burden on the processor performing the game computation.

To this end, the present invention provides a display scrolling circuit for scrolling a display image in the horizontal or vertical direction for every display line, comprising:

a first storage means for storing data relating to each pixel of the display image;

a second storage means for storing the amount of scrolling in at least one of the horizontal and vertical directions for every display line of the display image; and an address control means responsive to the amount of scrolling of the next display line stored in said second storage means for specifying read addresses of data for pixels of the next display line stored in said first storage means, wherein each time when one display line is changed to another, the read addresses of the next display line can be determined based on the amount of scrolling for every display line stored in said second storage means to perform scrolling the display image for every display line.

The present invention also provides a method of scrolling a display image in the horizontal or vertical direction for every display line, comprising the steps of:

storing data relating to pixels on the display image and the amount of scrolling in at least one of the horizontal and vertical directions for every display line on the display image in a storage means; and reading data relating to pixels of the next display line stored in said storage means in response to the amount of scrolling of the next display line stored in said storage means;

wherein scrolling the display image for every display line is performed by repeating said two steps each time when one display line is changed to another.

According to the present invention, thus, the first storage means stores the data relating to the displayed pixels while the second storage means stores the amount of scrolling for every display line. The address control means reads the amount of scrolling of the next display line stored in the second storage means to determine the read addresses of the pixel data corresponding to the next line each time when one display line is changed to another. The determined read addresses are then used to access the first storage means. Therefore, the amount of scrolling can be varied by changing the position of data read for every display line.

According to the present invention, further, the amount of scrolling of the next line is read to determine the read addresses of the data each time when one display line is changed to another. Therefore, different amount of scrolls can be set for the respective display lines such that the display image becomes variable by scrolling for every line. Since the address control means is responsive to the amount of scrolling of the next line for determining the read addresses of the data to perform scrolling for every line, the processor for performing the game computation will not be influenced by the scrolling without increase of the burden thereon.

The present invention also provides a display scrolling circuit for scrolling a display image in the horizontal or vertical direction for every display line, comprising:

a first storage means for storing character specifying data used to specify a character;

a second storage means for storing the amount of scrolling in at least one of the horizontal and vertical directions for every display line of the display image;

a character data storage means for storing data relating to each pixels in the character;

an address control means responsive to the amount of scrolling of the next display line stored in the second storage means for specifying read addresses of the character specifying data for the next display line stored in the first storage means; and an address-in-character specifying means responsive to the character specifying data read out from the first storage means according to addressing by said address control means for specifying a particular character to be displayed stored in said character data storage means and also responsive to the amount of scrolling of the next display line stored in said second storage means for reading data relating to a particular pixel in the particular character, wherein each time when one display line is changed to another, the read addresses of the next display line can be determined based on the amount of scrolling for every display line stored in the second storage means to perform scrolling the display image for every display line.

The present invention further provides a method of scrolling a display image using a display scrolling circuit for scrolling the display image in the horizontal or vertical direction for every display line comprising a character data storage means for storing data relating to each pixel in a character and a first storage means for storing character specifying data used to specify the character, the method comprising the steps of:

storing the amount of scrolling in at least one of the horizontal and vertical directions for every display line of the display image in a second storage means;

specifying read addresses of the character specifying data of the next display line stored in the first storage means in response to the amount of scrolling of the next display line stored in the second storage means; and responding to the character specifying data read out from said first storage means according to addressing for specifying a particular character stored in said character data storage means and also responding to the amount of scrolling of the next display line stored in said second storage means for reading data relating to a particular pixel in the character;

wherein scrolling the display image for every display line is performed by repeating said steps each time when one display line is changed to another.

According to the present invention, thus, the first storage means stores the character specifying data for specifying each of the characters forming the display image while the second storage means stores the amount of scrolling for each line. Each time when one display line is changed to another, the address control means reads the amount of scrolling of the next display line stored in the second storage means to determine the read addresses of the character specifying data of a character corresponding to the next line, the determined addresses being then used to access the first storage means. Further, the address control means is responsive to the amount of scrolling of the next line to specify pixels in a character when data relating to pixels in each of the characters stored in the character data storage means according to the character specifying data read out from the first storage means. When the display image is formed by characters, therefore, the amount of scrolling can be varied by changing the position of data read out for every display line.

According to the present invention, further, the amount of scrolling of the next display line is read out to determine the character specifying data and the pixels in the character specified by the character specifying data each time when one display line is changed to another. Thus, various amount of scrolling can be done for the respective display lines, so that the display image has a variety by scrolling for every line. Since the address control means is responsive to the amount of scrolling of the next line for determining the read addresses of the data to perform scrolling for every line, the processor for performing the game computation will not be influenced by the scrolling without increase of the burden thereon.

According to the present invention, the first and second storage means may be formed by a single memory and the amount of scrolling of the next display line is read out during a horizontal blanking period.

In such an arrangement, the memory structure may be simplified with simplification of various circuits such as address control and other circuits which access the memory.

If the reading-out of the amount of scrolling is carried out during the horizontal blanking period which is an interval between each adjacent line displays, the single memory may be used without any obstruction since the timing of reading various data relating to the pixels is necessarily different from the timing of reading the amount of scrolling.

In the present invention, it is preferred that the second storage means includes a flag for every one or more display lines, the flag indicating whether the amount of scrolling for every display line is an absolute value or a relative value for a previous display line.

In such an arrangement, the state of the flag can specify whether the amount of scrolling is an absolute value or a relative value for the previous line. Depending on the scrolling, therefore, the amount of scrolling can be set by the relative value to simplify the data to be handled. This relieves the burden on the address control means.

According to the present invention, furthermore, the second storage means can store the amount of scrolling in the vertical direction for every display line, and the display image is reduced, enlarged or reversed in the vertical direction by omitting or repeating a part of data reading, or doubling back data reading from any display line.

Thus, the display image can be vertically reduced if a part of data reading is omitted. The display image can be vertically enlarged if a part of data reading is repeated. The display image can be reversed about any display line if data reading is doubled back from the display line. By setting the amount of scrolling for every display line, therefore, various types of image operations can be accomplished which would not be realized by the prior art.

DETAILED DESCRIPTION OF THE PREFERRED EMBODIMENTS

First Embodiment

Figure 1:
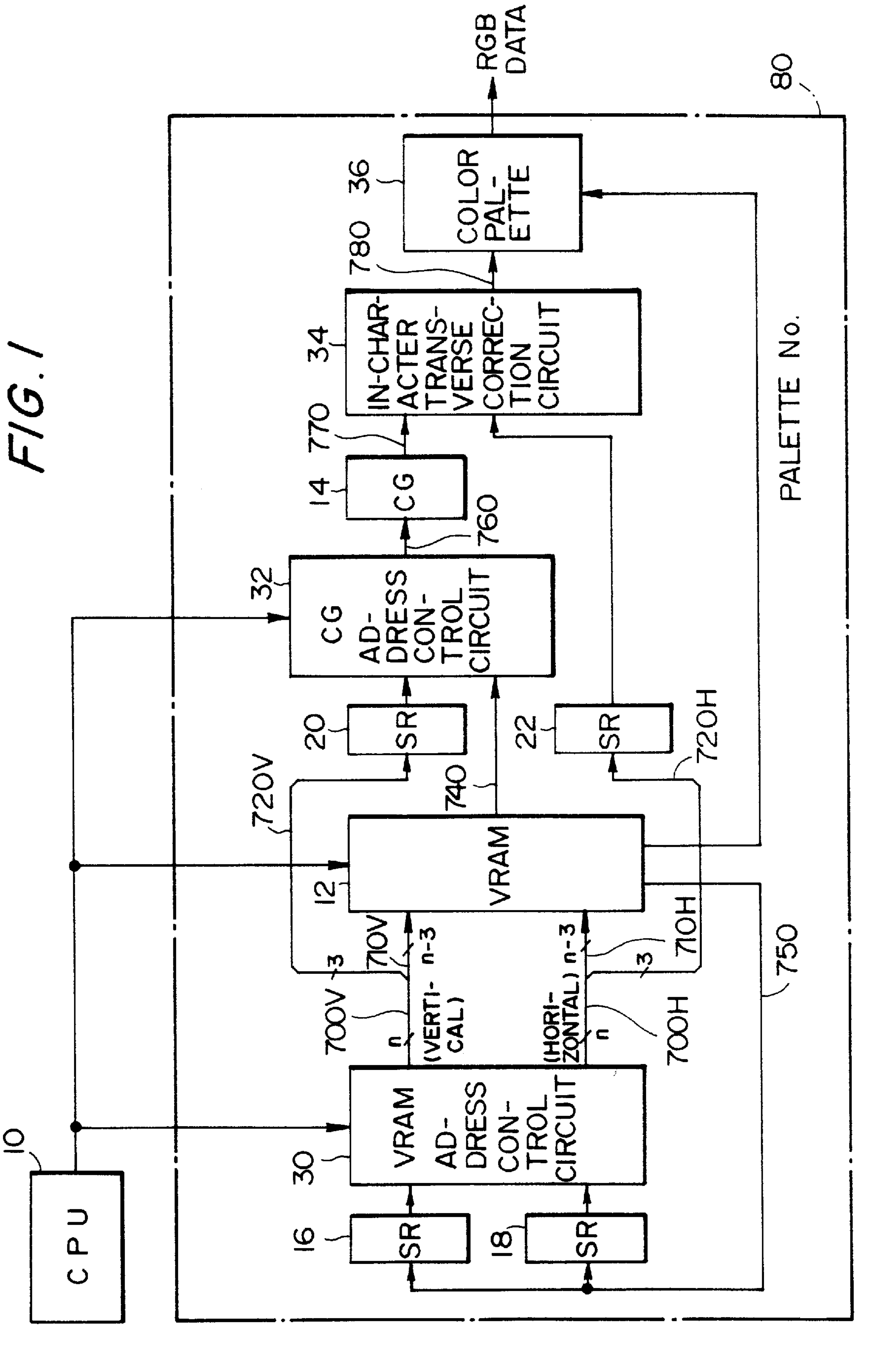
FIG. 1 illustrates the entire layout of one embodiment of a display scrolling circuit constructed in accordance with the present invention.

FIG. 1 shows a game system according to the present invention.

The game system comprises a CPU 10 for performing a necessary game computation to control the entire game system and a display scrolling circuit 80 responsive to the results of computation from the CPU to operate for an image to be displayed on a display.

Figure 4:
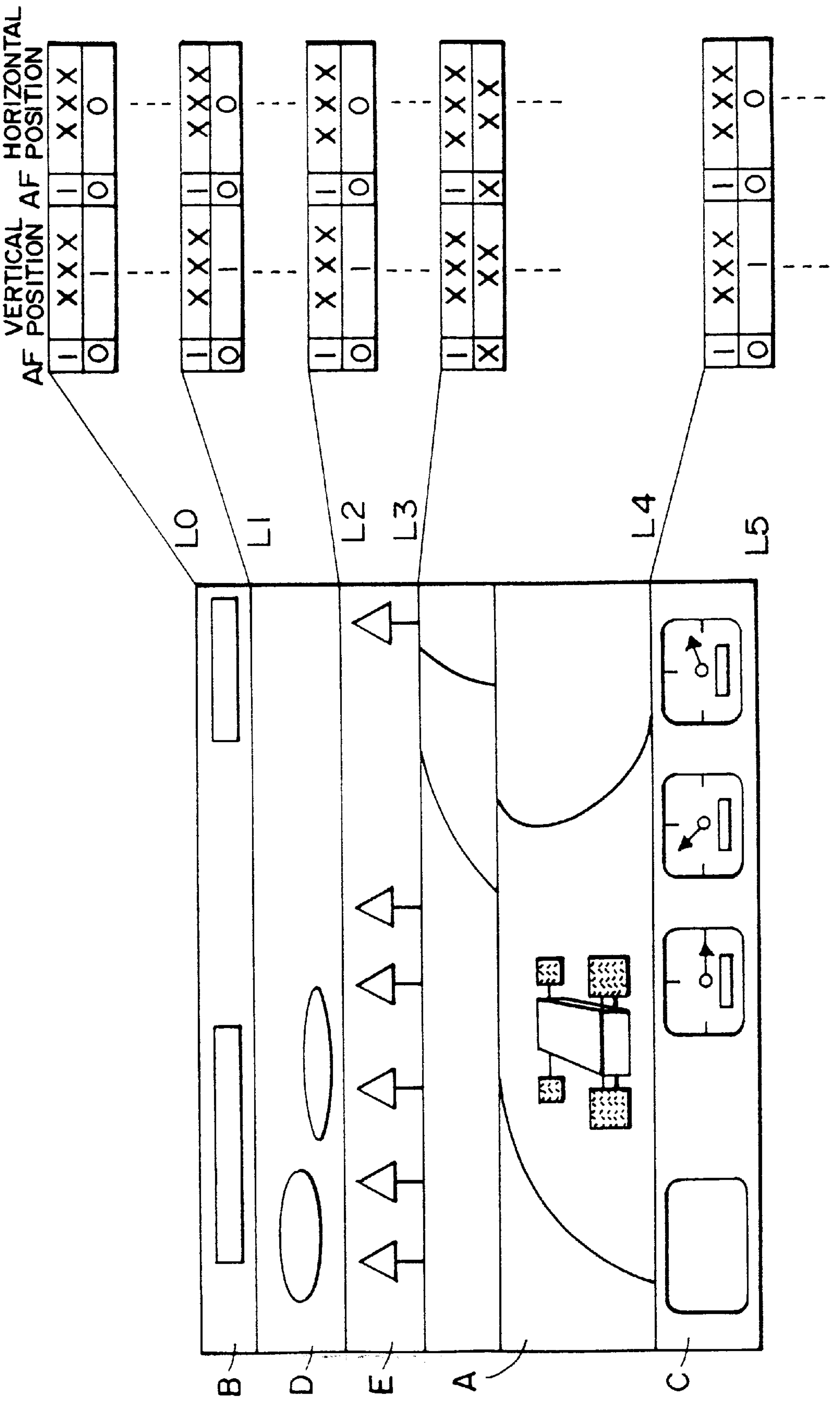
FIG. 4 is a view showing a display image according to the first embodiment.

In the first embodiment, the display scrolling circuit 80 may use a so-called character block system to display such a game image as shown in FIG. 4 on the display. For such a purpose, the display scrolling circuit 80 comprises a video RAM (VRAM) 12, a character generator (CG) 14, scroll registers (SR) 16, 18, 20 and 22, a VRAM address control circuit 30, a CG address control circuit 32, an in-character transverse correction circuit 34 and a color palette 36.

Figure 6A:
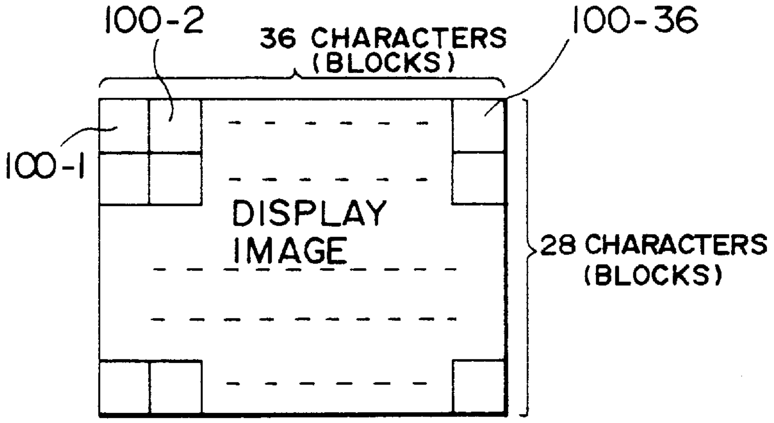
FIG. 6A illustrates a display using the character block system and FIG. 6B illustrates a character block.

FIG. 6A shows a display using this display scrolling circuit 80.

Figure 6B:
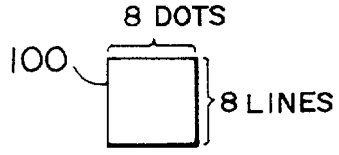

It is now assumed that the display image of 288×224 dots as shown in FIG. 6A is divided into a plurality of such character blocks 100 as shown in FIG. 6B, each block being a square of 8×8 dots. In such a case, the display image shown in FIG. 6A is divided into character blocks equal to 36(horizontal)×28(vertical)

When a plurality of color character data have been previously registered in a memory, each color character data can be fitted in the corresponding character block to synthesize a scene, and the desired image can be formed on the display.

For such a purpose, color character data forming each of characters are stored in the character generator (CG) 14. Each color character data consists of 8×8 pixels corresponding to each character block 100 shown in FIG. 6B. Each of the pixels is formed by an 8-bit color data.

Figure 7:
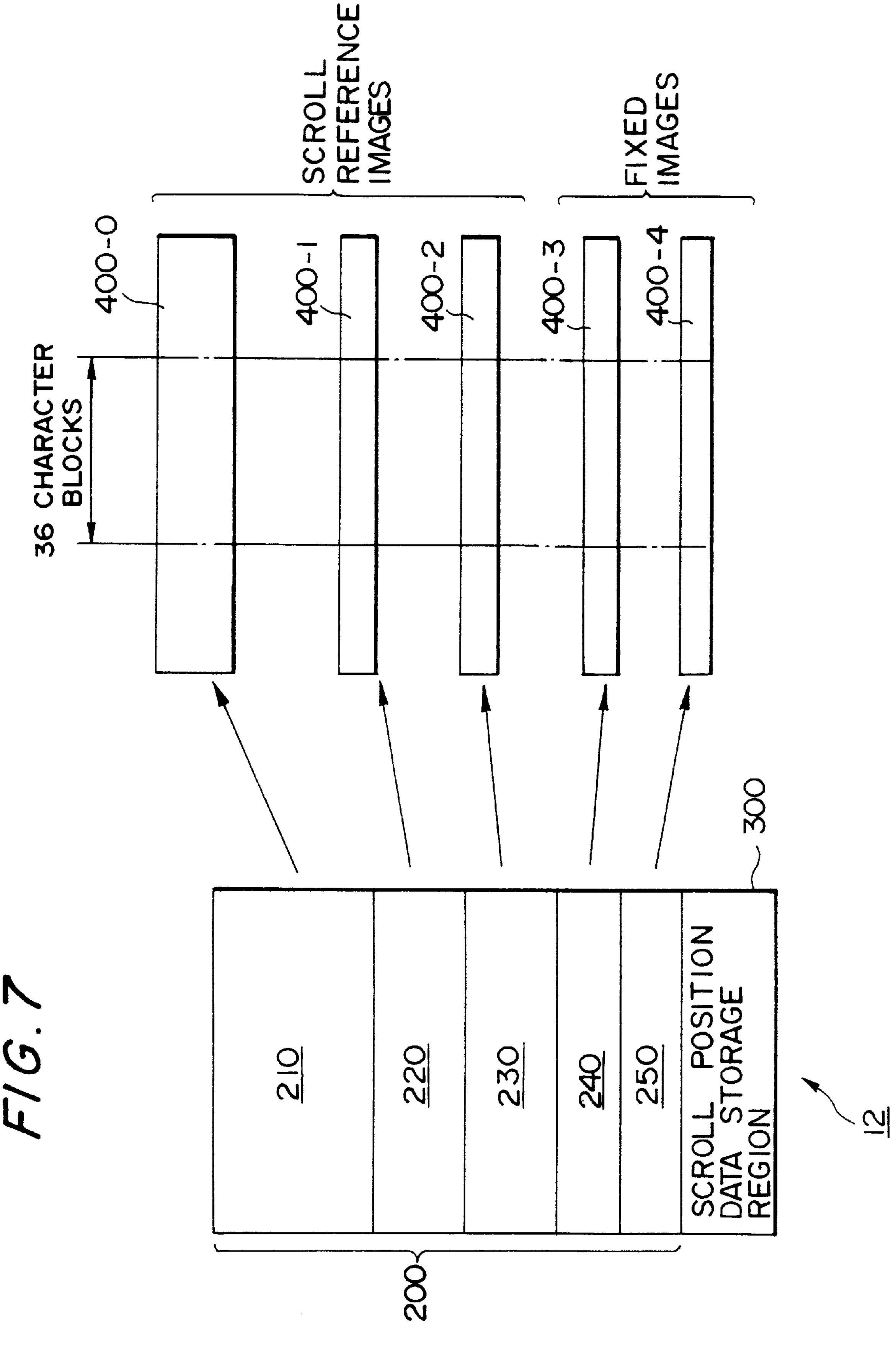
FIG. 7 illustrates the layout of the image data storage region of the VRAM.

FIG. 7 shows the details of the VRAM 12 in the first embodiment. The VRAM 12 includes an image data storage region 200 and a scroll position data storage region 300.

The image data storage region 200 includes a plurality of storage areas 210, 220, 230, 240 and 250.

The areas 210, 220 and 230 are provided for scroll reference images 400-0, 400-1 and 400-2, respectively. Each of the storage areas 210, 220 and 230 stores character specifying data required to read a color character data to be displayed in each of the character blocks in the respective one of the scroll reference images 400-0, 400-1 and 400-2 from the character generator 14. Each of the scroll reference images 400-0, 400-1 and 400-2 has its magnitude transversely larger than a display image in the first embodiment, to enable the transverse scrolling.

Each of the storage areas 240 and 250 stores character specifying data for reading color character data for the corresponding one of fixed images 400-3 and 400-4 from the character generator 14.

As will be described, these pictures 400-0 to 400-4 are vertically arranged to form a display image, as shown in FIG. 4. The vertically combination of the images 400-0 to 400-4 is set to have 28 character blocks as shown in FIG. 6A.

The first embodiment is characterized by that the scroll position data storage region 300 is provided in the VRAM 12 in addition to the image data storage region 200.

The scroll position data storage region 300 of the VRAM 12 stores vertical and horizontal position data used to specify a display starting position for each display line and absolute flags AF indicating whether each of the position data is an absolute or relative value, these data corresponding to a display image. For example, AF=1 indicates that each position data is an absolute value. At this time, the scroll position data storage region 300 stores the absolute value of the vertical or horizontal address of the VRAM 12 as a position data. On the other hand, AF=0 indicates that the each position data is a relative value. At this time, the scroll position data storage region 300 stores data indicative of the display starting position relative to the display starting position for one previous display line (or the vertical or horizontal address in the VRAM 12) as a position data.

Figures 2A, 2B:
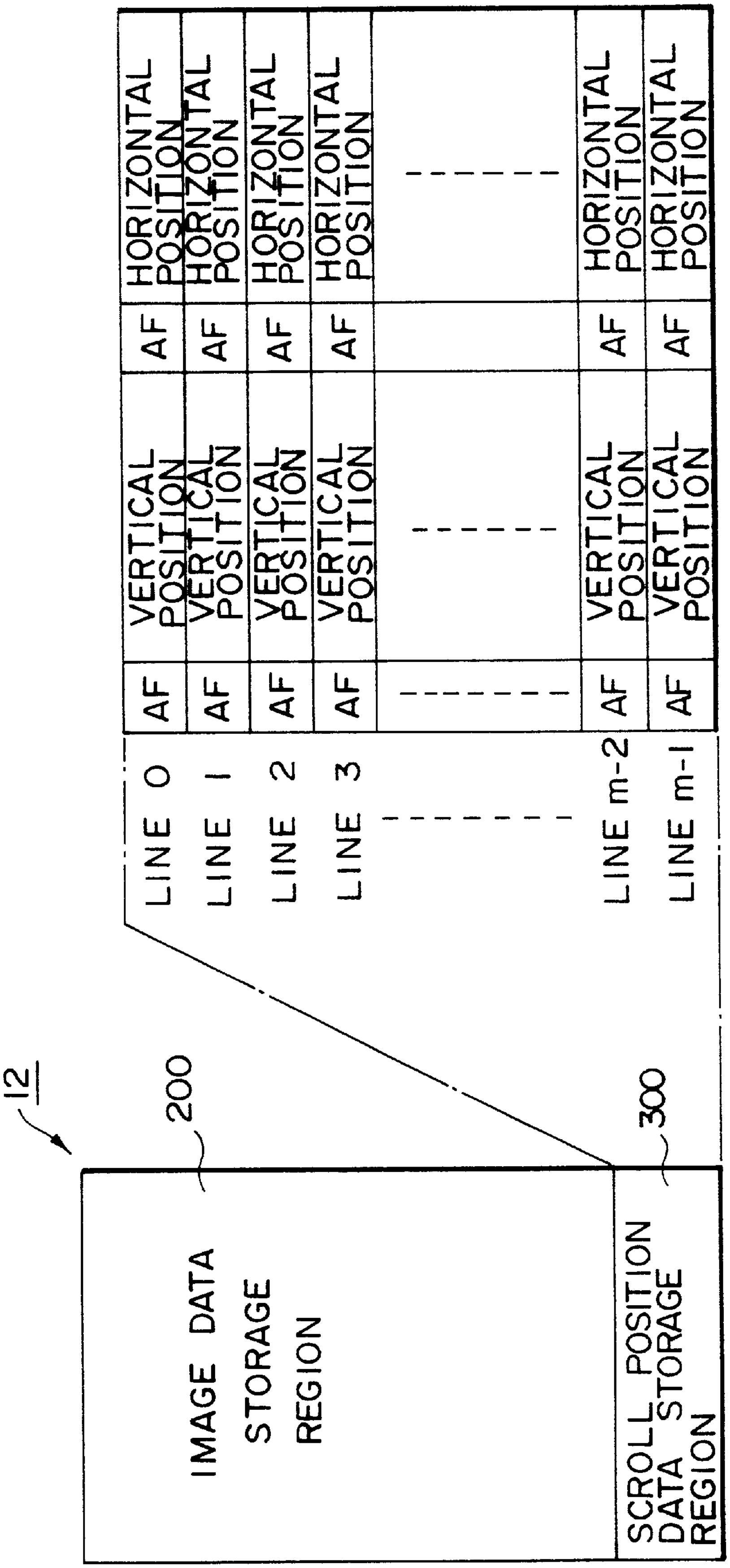
FIGS. 2A and 2B show the details of data stored in VRAM.

FIG. 2B shows the details of data stored in the scroll position data storage region 300. If the display image of FIG. 6A is formed by m display lines, the scroll position data storage region 300 will store the vertical and horizontal position data each of 9 bits corresponding to each display line and an absolute flag AF of one bit corresponding to the respective one of the position data. In other words, data corresponding to the m display lines which form a display image are stored in this region 300.

The vertical and horizontal position data and absolute flags AF in the VRAM 12 are rewritten by the CPU 10 when one display image is changed to another. In other words, these data are updated to data for the next image during the vertical scene blanking period.

The VRAM address control circuit 30 is adapted to control the reading of the character specifying data, vertical and horizontal position data and other data which are stored in the VRAM 12 and also to output various signals 700V and 700H required to set and read their read addresses toward the VRAM 12.

In the first embodiment, each of the characters 100 is formed by 8×8 pixels. For such a purpose, the VRAM address control circuit 30 outputs the address data 700V and 700H of n bits added vertically and horizontally by three low-order bits to specify each pixel in the character 100 and inputs only the (n-3)-bit high-order data 710V and 710H among the address data toward the VRAM 12.

Each of the character specifying data 740 stored in the VRAM 12 is specified by the vertical and horizontal (n-3)-bit address data 710V and 710H.

The scroll register 16 is adapted to temporally hold the vertical position data and associated absolute flag AF which are read out from the VRAM 12. The contents thus held are input into the VRAM address control circuit 30. For example, the scroll register 16 may have its capacity of 10 bits, the most significant bit holding the absolute flag AF and the other nine low-order bits holding the vertical position data.

Similarly, the scroll register 18 is adapted to temporally hold the horizontal position data and associated absolute flag AF which have been stored in the VRAM 12. The data thus held is then input into the VRAM address control circuit 30. For example, the scroll register 18 may has its capacity of 10 bits as in the scroll register 16 while the most significant bit of the scroll register 18 holds the absolute flag AF and the other nine low-order bits hold the horizontal position data.

The scroll register 20 is adapted to hold the low-order 3-bit data 720V in the vertical address data 700V of n bits which are output from the VRAM address control circuit 30. The held 3-bit data 720V is input into the CG address control circuit 32. Similarly, the scroll register 22 is adapted to hold the low-order 3-bit data 720H in the horizontal n-bit data 700H which is output from the VRAM address control circuit 30. The held 3-bit address data 720H is read out by the in-character transverse correction circuit 34.

The CG address control circuit 32 is responsive to the character specifying data 740 read out from the VRAM 12 for controlling the read-out of the color character data stored in the CG 14 and also for inputting various types of signals 760 required to set and read the read address into the CG 14. In fact, when the CG 14 is to be controlled in reading, a character is specified by the character specifying data 740 output from the VRAM 12. At the same time, the 3-bit data 720V input from the scroll register 20 specifies on which line pixels in this character should be read out. The read-out control by the CG address control circuit 32 reads data 770 corresponding to eight pixels (8 pixels×8 bits=64 bits) on the same line from the CG 14, the read data 770 being then input into the in-character transverse correction circuit 34 in a back stage.

The in-character transverse correction circuit 34 is adapted to extract desired data for one pixel from the horizontal 8-pixel data 770 which are read out from the CG 14. Which pixel in the eight pixels should be extracted is determined by the 3-bit data 720H stored in the scroll register 22. The color data (8-bit data) for one pixel extracted by the in-character transverse correction circuit 34 is input into the color palette 36.

The color palette 36 outputs RGB data based on the color data 780 output from the in-character transverse correction circuit 34 and the palette number output from the VRAM 12. More particularly, a palette which should be used is specified by the palette number output from the VRAM 12. RGB data in the specified palette which should be used is specified by the 8-bit color data 780 output from the in-character transverse correction circuit 34. Finally, RGB data for a color to be used will be output.

The RGB data is input into a driver circuit (not shown) in a back stage and then converted into an analog signal required to drive the display device before it is displayed on the display.

The display scrolling circuit of the first embodiment which has such an arrangement as described will further be described in connection with its operation.

Figure 3:
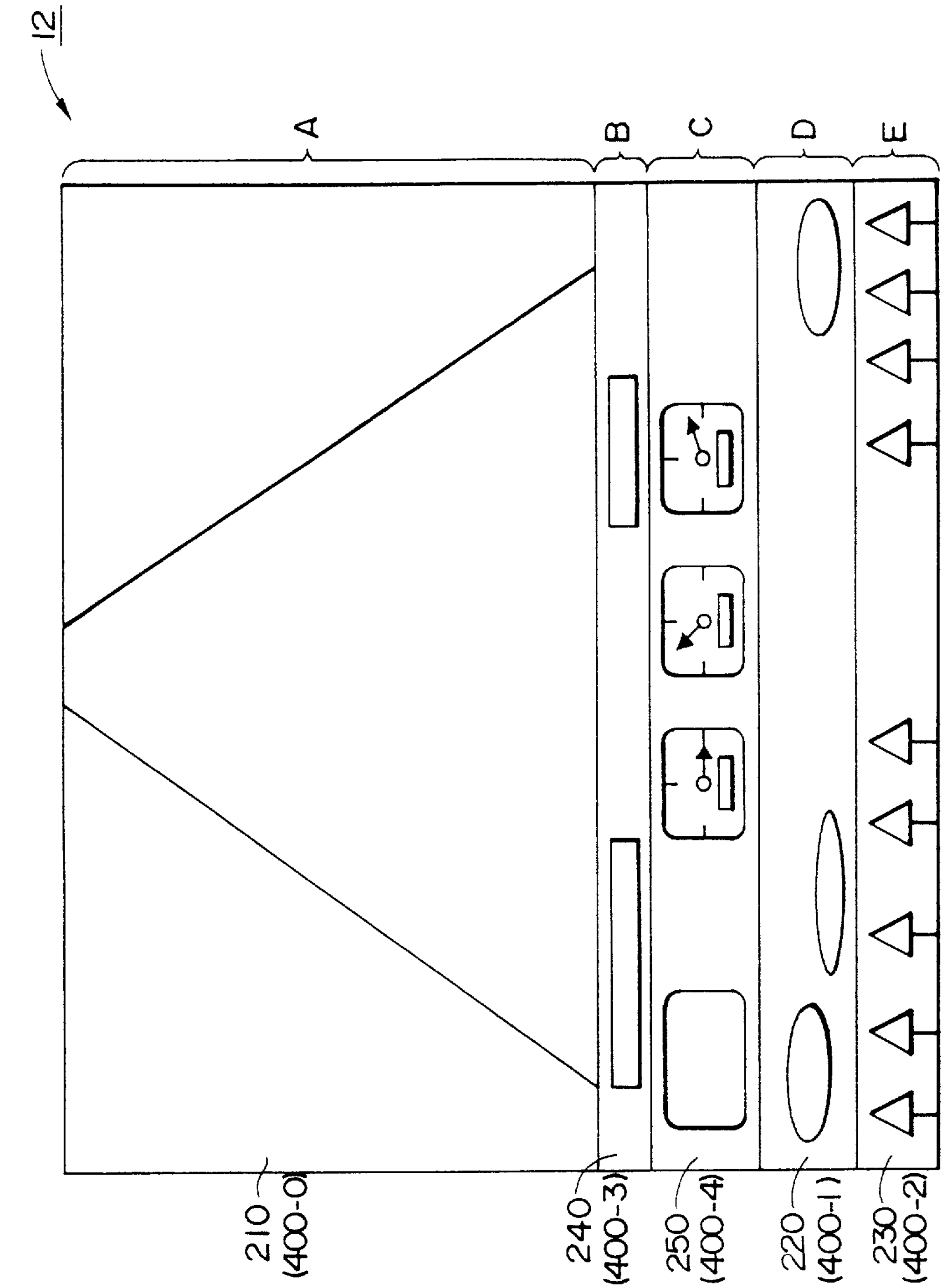
FIG. 3 illustrates the contents stored in the image data storage region of the VRAM.

FIG. 3 shows an image formed by data that have been stored in the image data storage region 200 of FIG. 7. This is actually accomplished by accessing the CG 14 of a back stage in response to the character specifying data stored in the respective storage areas 210–250 and also by obtaining RGB data through the color palette 36 in the back stage.

As shown in FIG. 3, the storage areas 210–250 of the image data storage region 200 are used to obtain five types of images A–D. In FIG. 3, image "A" represents a road (which corresponds to the scroll reference image 400-0); image "B" a score indicator (which corresponds to the fixed image 400-3); image "C" meters and others (which correspond to the fixed image 400-4); image "D" a slowly moving sky scene (which corresponds to the scroll reference image 400-1); and image "E" rapidly moving trees and others (which correspond to the scroll reference image 400-2). The images of the score indicator B and meters C are represented to be fixed in part of the screen while the other images A, E and D can be scrolled. However, the images A, E and D must be scrolled at different speeds in different directions. Such a scrolling could not be accomplished by the prior art.

The VRAM address control circuit 30, CG address control circuit 32 and in-character transverse correction circuit 34 will now be described in connection with their operations under different situations.

(1) VRAM Address Control Circuit 30

The VRAM address control circuit 30 outputs the vertical and horizontal n-bit address data 700V, 700H in which their (n−3) bits other than three low-order bits are used to address the VRAM 12. More particularly, the VRAM 12 is addressed by (2n−6)-bit address data 710V, 710H in the output address data 700V, 700H of total 2n bits. A character specifying data 740 stored in the VRAM 12 at the corresponding address will be read out from the VRAM 12. Thus, the VRAM address control circuit 30 reads the character specifying data 740 for each of the display lines from the VRAM 12. The read character specifying data 740 are then input into the CG address control circuit 32.

Prior to the read-out of the character specifying data 740, the VRAM address control circuit 30 also reads data 750 including the horizontal and vertical position data and associated data such as absolute flags AF and others from the region 300 of the VRAM 12. The read-out of these data is accomplished during the horizontal blanking period prior to the scan of the respective display lines. More particularly, after a character specifying data 740 has been read out for a line, data 750 including vertical and horizontal position data and associated absolute flags AF for the next display line from the VRAM 12 under the control of the VRAM address control circuit 30 during the next horizontal blanking period. The read vertical position data and associated absolute flag AF are once held in the scroll register 16. Similarly, the read horizontal position data and associated absolute flag are once held in the scroll register 18.

Subsequently, the VRAM address control circuit 30 reads the vertical position data held in the scroll register 16 to compute and output the vertical n-bit address data 700V. Similarly, the VRAM address control circuit 30 reads the horizontal position data held in the scroll register 18 to compute and output the n-bit address data 700H which is used to read the character specifying data to be displayed on the left end of the display line. If a line is being displayed, the vertical n-bit address data 700V remain fixed while the horizontal n-bit address data 700H are updated each time when the horizontal scan is performed for one display image.

In such a manner, the VRAM address control circuit 30 reads the character specifying data 740 stored in the VRAM 12 for the horizontal and vertical position data of the line to be displayed on the display. In addition, the data 740 to be read can be optionally specified for each line through the horizontal and vertical position data stored in the VRAM 12.

(2) CG Address Control Circuit 32

The CG address control circuit 32 is operative to address to read the respective character data stored in the CG 14. The address 760 used is computed from the output (character specifying data) 740 of the VRAM 12 and the data 720V held in the scroll register 20. More particularly, a character is specified by a character specifying data 740 output from the VRAM 12 and which pixel in the eight vertical pixels should be read out is determined by the 3-bit data 720V read out from the scroll register 20. Because there are eight horizontal pixels in each character, the CG 14 so addressed outputs data 770 which correspond to eight horizontal pixels for the specified character, that is, which are equal to 64 bits=8 pixels×8 bits.

(3) In-Character Transverse Correction Circuit 34

The in-character transverse correction circuit 34 is adapted to extract the data of a particular pixel from the data 770 of eight pixels output from the CG 14. The pixel to be extracted is specified by the 3-bit data 720H stored in the scroll register 22. The in-character transverse correction circuit 34 then outputs an 8-bit color data 780 corresponding to that particular pixel toward the color palette 36.

Although the first embodiment has been described as to the VRAM 12 having stored and outputting a palette number to be used toward the color palette 36, the palette number may be stored in any one of various other storage means such as exclusive register or the like.

FIG. 4 is a display image which may be obtained by scrolling the contents of the VRAM 12 shown in FIG. 3 for every line.

As shown in FIG. 4, the top (or from display line LO to display line (L1−1)) of the display represents the score indicator (image B) of FIG. 3; the display lines from L1 to (L2−1) represent the slowly moving sky scene (image D) of FIG. 3; the display lines from L2 to (L3−1) represent the rapidly moving trees (image E) of FIG. 3; the display lines from L3 to (L4−1) represent the road (image A) of FIG. 3; and the bottom (or display lines from L4 to (L5−1)) represent the meters (image C) of FIG. 3. When such a display is to be carried out, what manner the vertical and horizontal position data and associated absolute flags AF in the VRAM 12 are set will be described below.

1) Score Indicator (image B)

The image of this score indicator is not variable with the process of game. Thus, the vertical and horizontal absolute flags AF are set at "1" for a first display line L0 while the vertical and horizontal position data are set to be absolute addresses in the storage area 240 (of image B) shown in FIG. 3. The VRAM address control circuit 30 reads these data from the VRAM 12 to prepare address data 700V and 700H for the first display line. With subsequent display lines (L0+1) to (L1−1), the respective absolute flags AF are set at "0" while the contents of the vertical and horizontal position data are set at "1" and "0↑ respectively.

2) Slowly Moving Sky Scene (image D)

This image should be slowly scrolled in the transverse direction. As in the score indicator (image B), only the absolute flags AF for a first display line L1 are set at "1" while the vertical and horizontal position data for this display line L1 are specified by absolute values. With the other display lines (L1+1) to (L2−1), the respective absolute flags AF are set at "0" while the contents of the vertical and horizontal position data are set at "1" and "0↑ respectively. Each time when one image is changed to another, the vertical and horizontal position data for the display line L1 may be rewritten.

3) Rapidly Moving Trees (image E)

The scrolling of these images can be completely accomplished by the same manner as in the item 2). More particularly, the absolute flags AF are set at "1" only for a first display line L2 while the vertical and horizontal position data are set to be absolute values. With the other display lines, the absolute flags AF are set at "0" while the contents of the vertical and horizontal position data are set at "1" and "0↑ respectively. Each time when one image is changed to another, the vertical and horizontal position data for the display line L2 are changed with rates larger than the case of image D.

4) Road (A)

The road may be deformed to be rightward or leftward curved by varying the amount of scrolling of the display lines. For such a purpose, the amount of scrolling must be set for each of the display lines, unlike the images D and E. More particularly, the absolute flags AF for a first display line L3 are set at "1" while the vertical and horizontal data are set to be absolute values. With the other display lines, the amount of scrolling may be set to be either of absolute or relative values. When they are set to be absolute values, the absolute flags AF for the display lines (L3+1) to (L4−1) are set at "1" while the vertical and horizontal data are set at absolute values to progressively move the road leftward or rightward. With relative values, the absolute flags AF for the display lines may be set at "0" while the vertical and horizontal position data may be set to be relative values which are equal to differences between a display line and one previous display line.

FIG. 4 shows a racing car superimposed on the road. Such a racing car can be displayed by reading data from a dynamic picture VRAM (not shown) and finally superimposing the data on RGB data output from the color palette 36 of FIG. 1.

5) Meters (image C)

The meters are displayed in the same manner as in the top score indicator. More particularly, since the meters remains fixed and are not scrolled, only the absolute flags AF for a first display line L4 are set at "1" while the vertical and horizontal position data are set by absolute values. With the other display lines, the absolute flags AF are set at "0" while the contents of the vertical and horizontal position data are set at "1" and "0↑ respectively.

In such a manner, the amount of scrolling of the respective display lines (the vertical and horizontal position data for the respective display lines) have been stored in the VRAM 12 at its scroll position data storage region 300. Immediately before each of the display lines is displayed, these data 750 are read out to set the read address data 700V and 700H in the VRAM 12 during the horizontal blanking period. Since different contents and display starting positions can be set for every display line, different motions can be provided in a plurality of areas on the same display. This enables the image to be variable.

Since the amount of scrolling is set for every display line, for example, the road may be curved rightward or leftward as if a vehicle runs on the actual road. When a curved road is to be displayed, the prior art had to rewrite characters themselves when one image is changed to another. This increased the burden on a CPU which is used to make the rewriting. On the contrary, the system of the first embodiment may only rewrite the vertical and horizontal position data representing the amount of scrolling each time when one image is changed to another. Thus, the burden on the CPU can be greatly relieved. Particularly, if the absolute flags AF have been set at "0" the vertical and horizontal position data can be relatively simplified to further reduce the burden on the CPU.

Since the first embodiment can vary the contents of the vertical and horizontal position data for every display line, it is not required that the characters have previously been arranged in the VRAM 12 in such an order that the position data are to be displayed. More particularly, as shown in FIG. 3, the images A to E may be previously stored at appropriate addresses. As an actual display is to be made, proper addresses for displaying the corresponding image may be set.

Second Embodiment

Figure 5:
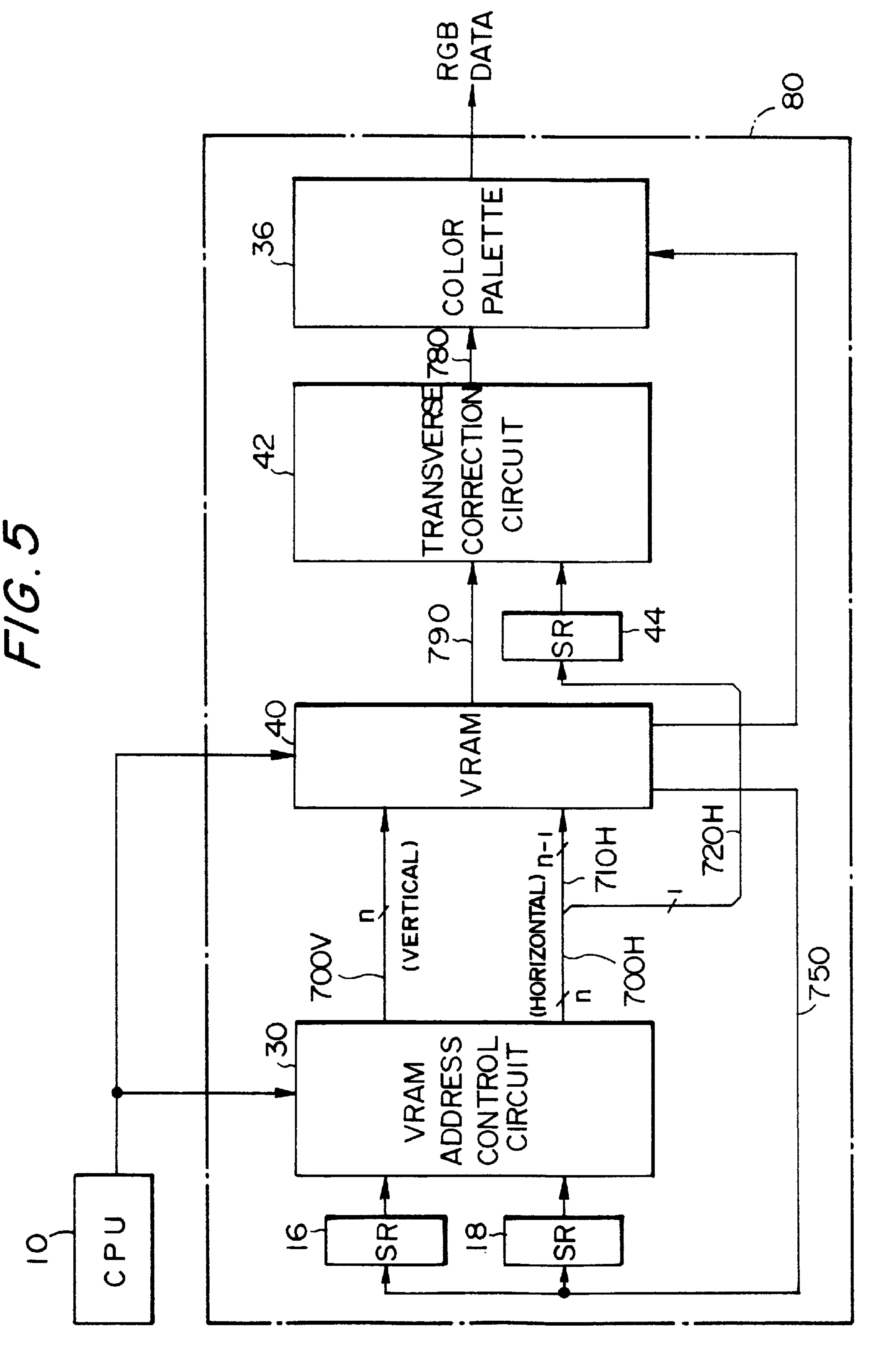
FIG. 5 illustrates the layout of the second embodiment of a display scrolling circuit constructed in accordance with the present invention.

FIG. 5 shows a second preferred embodiment of a display scrolling circuit according to the present invention. Parts corresponding to those of the first embodiment are designated by similar reference numerals and will not further be described.

The second embodiment is characterized by that it is a bit map display system.

The display scrolling circuit of the second embodiment is different from that of FIG. 1 mainly in the structures of a VRAM 40, transverse correction circuit 42 and scroll register (SR) 44.

The VRAM 40 comprises an image data storage region 200 and a scroll position data storage region 300, as in the first embodiment.

The storage areas 210, 220, 230, 240 and 250 of the image data storage region 200 store color data representing the images A, B, C, D and E shown in FIG. 3. More particularly, in the first embodiment, the character specifying data for the respective character blocks are written into the image data storage region 200. In the second embodiment, however, the same color data as the color data stored in the character generator are stored in the image data storage region 200. In other words, a color data corresponding to each of the pixels will be stored in the image data storage region 200. The color data themselves are output from the VRAM 40 for every pixel. Therefore, the second embodiment does not require such a character generator 14 as in the first embodiment.

It is now assumed that the second embodiment uses the same number of display lines and the same number of pixels defining one line as in the first embodiment. It is further assumed that one pixel is specified by vertical and horizontal n-bit address data 700V and 700H.

The VRAM address control circuit 30 prepares the vertical and horizontal n-bit address data 700V, 700H to be used to address the VRAM 40. The (n−1) bits 710H other than the least significant bit in the horizontal n-bit address data 700H are then input into the VRAM 40. Therefore, the color data 790 corresponding to two horizontal pixels will collectively be output from the VRAM 40. The least significant bit data 720 in the horizontal n-bit address data is input into and held in the scroll register 44.

The scroll position data storage region 300 of the VRAM 40 stores the vertical and horizontal position data and associated absolute flags AF which are in turn read out by the VRAM address control circuit 30 to prepare the vertical and horizontal address data 700V and 700H, as in the first embodiment.

The transverse correction circuit 42 is operative to extract color data corresponding to one pixel from the color data 790 of two pixels output from the VRAM 40. The color data for which pixel should be extracted is determined by 1-bit data 720H stored in the scroll register 44. Color data 780 of one pixel output from the transverse correction circuit 42 are then input into the color palette 36. The color palette 36 is responsive to a palette number from the VRAM 40 and the color data 780 to output RGB data.

The transverse correction circuit 42 must determine one color data to be extracted when the color data 790 of two pixels are output from the VRAM 40, but the transverse correction circuit 42 can be omitted if the VRAM 40 outputs the color data of only one pixel.

The present invention is not limited to the aforementioned embodiments, and various modifications can be made within the scope of the invention.

Although the first embodiment has been described mainly as to the transverse scroll of the display lines, the vertical scroll may be made if the vertical position data for a first line is rewritten each time when one image is changed to another. If both the vertical and horizontal position data are simultaneously rewritten each time when one image is changed to another, it is of course possible to make a diagonal scroll.

In the aforementioned embodiments, reading of the data in the VRAM 12 shown in FIG. 3 may be omitted or repeated by one line for several lines. The omitting can provide an image generally reduced in the vertical direction. On the contrary, repeating can provide an image enlarged in the vertical direction. Since the data to be read out from the VRAM 12 can be freely determined, the data in the VRAM 12 may be read out twice being doubled back from any display line. In such a case, a reverse image may be provided. Since the scroll position can be freely set for every line, more delicate control of the image which would not be realized by the prior art may be accomplished.

Although the aforementioned embodiments have been described as to the storage of data corresponding to one display image, data corresponding to a plurality of display images may be stored. In such a case, the vertical and horizontal position data for all the display images or for only one display image may be stored optionally.

Although the previous embodiments have been described as to that the CPU 10 updates the scroll position data storage region shown in FIG. 2A during the vertical blanking period for each frame, scroll position data storage regions for two frames may be provided such that the two scroll position data storage regions will be switched from one to another for updating or reading. In such a case, the scroll position data storage region may be updated during one frame display period rather than the vertical blanking period, the burden on the CPU can be further reduced.

We claim:

1. A display scrolling circuit for scrolling each display line which constitutes a display image in at least the direction of said display line, comprising:

a first storage means for storing data relating to each pixel of the display image;

a second storage means for storing the amount of scrolling in at least the direction of said display line for every display line of the display image, wherein the amount of scrolling indicates the difference in display positions of successive display lines; and an address control means responsive to the amount of scrolling of the next display line stored in said second storage means for specifying read addresses of data for pixels of the next display line stored in said first storage means, wherein each time when one display line is changed to another, the read addresses of the next display line can be determined based on the amount of scrolling for every display line stored in said second storage means to perform scrolling the display image for every display line.

2. The display scrolling circuit as defined in claim 1 wherein said first and second storage means are formed by a single memory and wherein the amount of scrolling for the next display line is read out during a horizontal blanking period.

3. The display scrolling circuit as defined in claim 2 wherein said second storage means includes a flag for every one or more display lines, said flag being indicative of whether the amount of scrolling for every display line is an absolute value or a relative value for a previous display line.

4. The display scrolling circuit as defined in claim 2 wherein said second storage means stores the amount of vertical scrolling for every display line and wherein the display image is reduced, enlarged or reversed in the vertical direction by omitting or repeating a part of data reading, or doubling back data reading from any display line.

5. The display scrolling circuit as defined in claim 1 wherein said second storage means includes a flag for every one or more display lines, said flag being indicative of whether the amount of scrolling for every display line is an absolute value or a relative value for a previous display line.

6. The display scrolling circuit as defined in claim 1 wherein said second storage means stores the amount of vertical scrolling for every display line and wherein the display image is reduced, enlarged or reversed in the vertical direction by omitting or repeating a part of data reading, or doubling back data reading from any display line.

7. A display scrolling circuit for scrolling each display line which constitutes a display image in at least the direction of said display line, comprising:

a first storage means for storing character specifying data used to specify a character;

a second storage means for storing the amount of scrolling in at least the direction of said display line for every display line of the display image, wherein the amount of scrolling indicates the difference in display positions of successive display lines;

a character data storage means for storing data relating to each pixel in the character;

an address control means responsive to the amount of scrolling of the next display line stored in said second storage means for specifying read addresses of said character specifying data for the next display line stored in said first storage means; and an address-in-character specifying means responsive to said character specifying data read out from said first storage means according to said addressing by said address control means for specifying a particular character stored in said character data storage means and also responsive to the amount of scrolling of the next display line stored in said second storage means for reading data relating to a particular pixel in the particular character, wherein each time one display line is changed to another, the read addresses of the next display line can be determined based on the amount of scrolling for every display line stored in said second storage means to perform scrolling the display image for every display line.

8. The display scrolling circuit as defined in claim 7 wherein said first and second storage means are formed by a single memory and wherein the amount of scrolling for the next display line is read out during a horizontal blanking period.

9. The display scrolling circuit as defined in claim 8 wherein said second storage means includes a flag for every one or more display lines, said flag being indicative of whether the amount of scrolling for every display line is an absolute value or a relative value for a previous display line.

10. The display scrolling circuit as defined in claim 8 wherein said second storage means stores the amount of vertical scrolling for every display line and wherein the display image is reduced, enlarged or reversed in the vertical direction by omitting or repeating a part of data reading, or doubling back data reading from any display line.

11. The display scrolling circuit as defined in claim 7 wherein said second storage means includes a flag for every one or more display lines, said flag being indicative of whether the amount of scrolling for every display line is an absolute value or a relative value for a previous display line.

12. The display scrolling circuit as defined in claim 7 wherein said second storage means stores the amount of vertical scrolling for every display line and wherein the display image is reduced, enlarged or reversed in the vertical direction by omitting or repeating a part of data reading, or doubling back data reading from any display line.

13. A method of scrolling each display line which constitutes a display image in at least the direction of said display line, comprising the steps of:

storing data relating to pixels on the display image and the amount of scrolling in at least the direction of said display line for every display line on the display image in a storage means, wherein the amount of scrolling indicates the difference in display positions of successive display lines; and reading data relating to pixels of the next display line stored in said storage means in response to the amount of scrolling of the next display line stored in said storage means;

wherein scrolling the display image for every display line is performed by repeating said two steps each time when one display line is changed to another.

14. A method of scrolling a display image using a display scrolling circuit for scrolling each display line which constitutes the display image in at least the direction of said display line, said circuit comprising a character data storage means for storing data relating to each pixel in a character and a first storage means for storing character specifying data used to specify the character, the method comprising the steps of:

storing the amount of scrolling in at least one of the horizontal and vertical directions for every display line of the display image in a second storage means, wherein the amount of scrolling indicates the difference in display positions of successive display lines;

specifying read addresses of the character specifying data of the next display line stored in said first storage means in response to the amount of scrolling of the next display line stored in said second storage means; and responding to the character specifying data read out from said first storage means according to addressing for specifying a particular character stored in said character data storage means and also responding to the amount of scrolling of the next display line stored in said second storage means for reading data relating to a particular pixel in the character, wherein scrolling the display image for every display line is performed by repeating said steps each time when one display line is changed to another.

* * * * *